Figure 1:
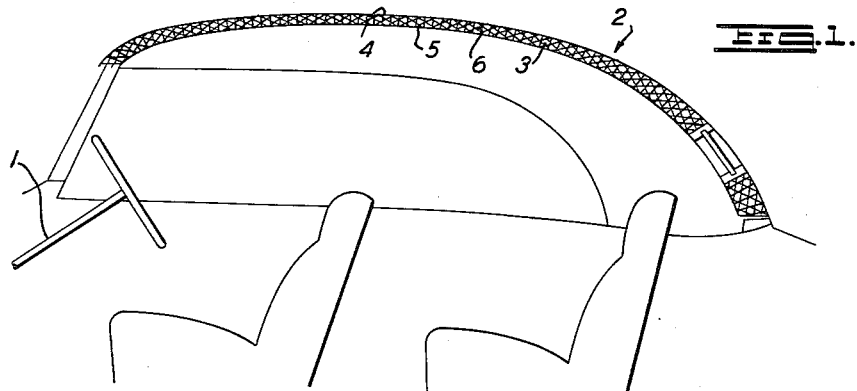

Aug. 21, 1962 F. GEIGER 3,050,334
FOLDABLE ROOF FOR MOTOR VEHICLES
Filed Jan. 18, 1960 2 Sheets-Sheet 1

INVENTOR
FRIEDRICH GEIGER

BY *Dicke, Craig & Freudenberg*
ATTORNEYS

Aug. 21, 1962  F. GEIGER  3,050,334
FOLDABLE ROOF FOR MOTOR VEHICLES
Filed Jan. 18, 1960  2 Sheets-Sheet 2
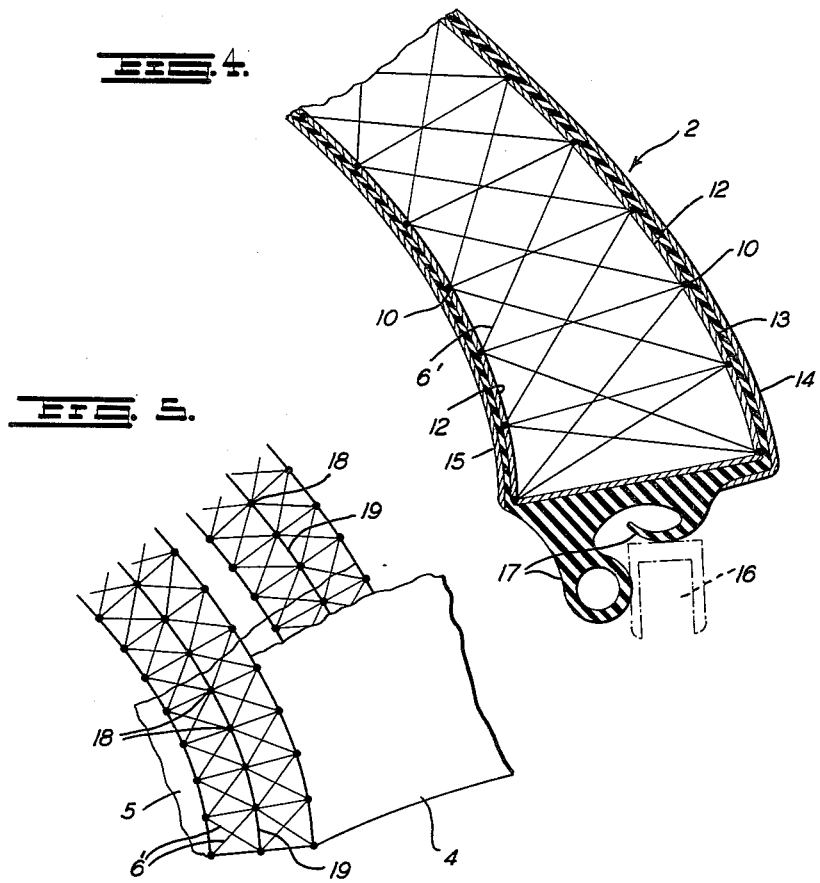
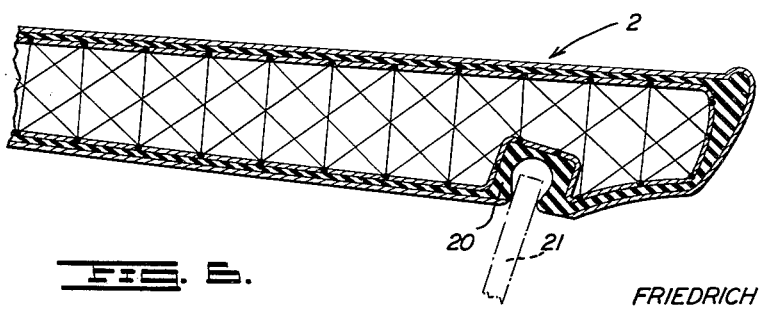
INVENTOR
FRIEDRICH GEIGER
BY Dicke, Craig & Freudenberg
ATTORNEYS

United States Patent Office 3,050,334
Patented Aug. 21, 1962

3,050,334
FOLDABLE ROOF FOR MOTOR VEHICLES
Friedrich Geiger, Boblingen, Germany, assignor to Daimler-Benz Aktiengesellschaft, Stuttgart-Unterturkheim, Germany
Filed Jan. 18, 1960, Ser. No. 3,113
Claims priority, application Germany Jan. 23, 1959
2 Claims. (Cl. 296—107)

The present invention relates to a foldable roof or top for motor vehicles which consists of an air-tight casing provided with a hollow space adapted to be filled with compressed air, which forms or constitutes the roof outer cover and the roof inner cover, respectively, and essentially consists in arranging connecting means such as threads, cords, webs, bands, ribbons or the like within the hollow roof space which are loaded exclusively in tension and connect the outer roof cover of the roof casing with the inner roof cover thereof.

It is achieved by the use of the present invention in a particularly advantageous manner that the casing forming the top or roof of the vehicle which is filled with compressed air gains an extraordinary rigidity in shape so that the arrangement of individual air channels on the top which entail a particularly unaesthetic effect as well as any other reinforcing parts such as roof supports, rib elements, joint parts and any other supporting parts, for instance, intermediate supports are obviated and a substantially smooth outer contoured roof is achieved thereby. The casing in accordance with the present invention and filled with compressed air absorbs in itself all vibrations and thrust forces caused by the driving wind. Consequently, the casing maintains or retains its shape even with the side windows lowered, and does not impair with closed side windows the seals with respect to the side windows. As soon as the compressed air is removed or relieved from the casing, the connecting elements such as the threads, cords, bands or the like, disposed therein, collapse in themselves by reason of the missing tensioning force so that the casing may be accommodated within a relatively small space when not inflated.

According to a further feature of the present invention the connecting means between the outer covering and the inner covering of the roof may be arranged in the manner of a lattice system.

Furthermore, the connecting means may also form several plane lattice systems arranged parallel to each other which extend either transversely to the vehicle longitudinal direction and/or in this vehicle longitudinal direction. The lattice system may also be constructed as a three-dimensional lattice. Furthermore, the connecting means may be interconnected with each other at the junction points and the junction points may additionally be connected with each other by connecting means disposed essentially parallel to the outer covering and inner covering of the roof casing.

The connecting means, according to a further feature in accordance with the present invention, may be woven into a fabric casing or may be braided into the fabric casing, or again may be hooked into the fabric casing, and the fabric casing may be connected, for purposes of forming the inner and outer roof cover, with an air-tight casing, for example, made of rubber or the like, and with cover fabric at the outer cover thereof and with a decorative lining at the inner cover thereof.

Furthermore, the roof lock, the sealing profile elements and any other sealing and securing mechanisms may be vulcanized to or into the air-tight casing.

Accordingly, it is an object of the present invention to provide a foldable or collapsible roof for motor vehicles which, in itself, offers an excellent rigidity as to shape thereof, yet may be readily stored in a relatively small space.

Another object of the present invention is the provision of a foldable top for a motor vehicle which is adapted to be inflated and which is neither impaired as to form thereof by lowered side windows nor impairs the window seals with the side windows closed.

Another object of the present invention is the provision of a foldable roof forming a hollow space for motor vehicles which is adapted to be inflated and in which the inner and outer air-tight covers are connected with each other by elements subjected only to tensional forces so as to utilize the same only upon inflation of the hollow space.

Figure 2:
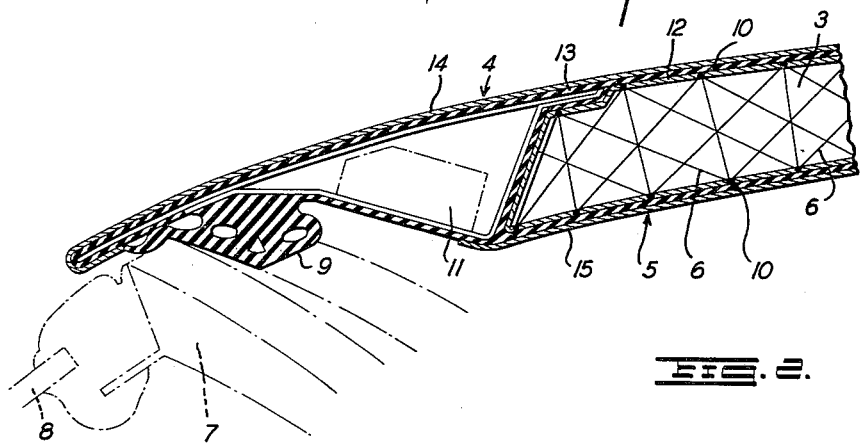
Figure 3:
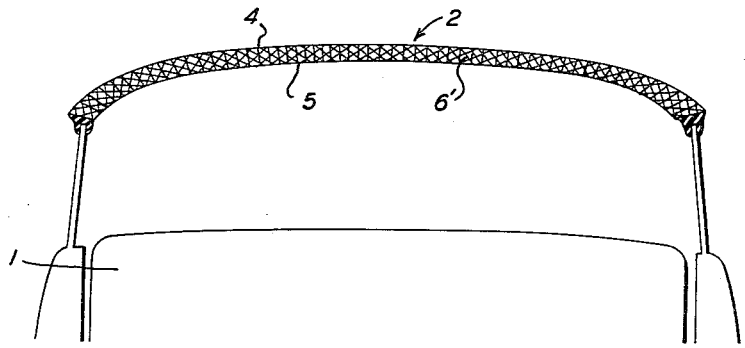

These and other objects, features and advantages of the present invention will become more obvious from the following description when taken in connection with the accompanying drawing which shows, for purposes of illustration only, several embodiments in accordance with the present invention and wherein:

FIGURE 1 is a schematic longitudinal cross-sectional view through a foldable roof in accordance with the present invention for a motor vehicle, FIGURE 2 is a cross-sectional view, on an enlarged scale, of the roof of FIGURE 1 illustrating the forward portion thereof, FIGURE 3 is a schematic transverse cross-sectional view through a roof similar to that of FIGURE 1, FIGURE 4 is a transverse cross-sectional view, on an enlarged scale, of the roof illustrated in FIGURE 3, FIGURE 5 illustrates somewhat schematically a roof in accordance with the present invention in which the inner and outer cover are interconnected by connecting means, suitably fastened at the junction points thereof, and FIGURE 6 illustrates a cross-sectional view of a modified embodiment of a top in accordance with the present invention which includes the seals for the window panes.

Referring now to the drawing wherein like reference numerals are used throughout the various views to designate corresponding parts, and more particularly to FIGURE 1 which illustrates a schematic longitudinal cross-section through a motor vehicle 1 provided with a collapsible or foldable roof or top generally designated therein by reference numeral 2, the roof 2 in accordance with the present invention essentially consists of a casing provided with a hollow space 3 adapted to be inflated with compressed air. The casing thereby also forms the roof outer covering 4 and the roof inner covering 5. Connecting means 6 which are adapted to be subjected exclusively to tensional loads are arranged within the hollow space 3 which connect the roof outer cover 4 with the roof inner cover 5. The connecting means may consist, for example, of rod-like elements such as threads, cords, ropes, bands, webs or the like made of any suitable material such as fabric material, plastic material, or the like. The connecting means in the roof according to FIGURE 1 form a planar lattice system of which several are arranged parallel to each other in the vehicle longitudinal direction. As may be clearly visible from FIGURE 2 illustrating, on an enlarged scale, the forward end of the roof construction of FIGURE 1, the roof 2 rests with the forward part thereof on the frame 7 for the windshield 8 with the aid of the seal 9. The connecting means in FIGURE 2 are arranged as a longitudinal lattice system. From each securing point 10 of the connecting means 6 with the outer roof cover 4, a connecting means extends at the shortest distance through the hollow space 3 toward an oppositely disposed securing point 10 with the inner cover 5. Additionally, two further connecting means 6 extending in an oblique direction lead from each securing point 10 to the next adjacent opposite securing point 10 on the opposite cover.

The roof lock 11 schematically indicated in FIGURE 2 is arranged at the roof 2. The roof itself consists of a fabric casing 12 into which are hooked or interwoven or suitably secured in any other known manner the connecting means 6, of the air-tight casing 13 made of rubber-like material which surrounds the fabric casing 12, and of the outer cover material 14 at the outside of the roof connected with the rubber-like material 13 as well as of the inner fabric 15 at the inside of the roof secured to the inner rubber-like material.

FIGURE 3 illustrates in schematic transverse cross-sectional view a modified embodiment of the roof or top 2 of the vehicle 1 in which, however, the connecting means 6' connecting the outer cover 4 with the inner cover 5 thereof are arranged in a planar lattice system which are all disposed parallel adjacent one another in a direction transverse to the vehicle longitudinal direction. FIGURE 4 illustrates an enlarged cross-sectional view of the roof 2 of FIGURE 3 in proximity to the side window 16 thereof whereby the roof 2 rigidly abuts against the upper edge portion of the side window 16 by means of the seal 17 rigidly connected with the roof 2, for instance, vulcanized thereto. The roof 2 according to FIGURE 4 is constructed in the same manner as the roof according to FIGURE 2, even the individual lattice systems thereof show the same construction as in FIGURE 2, however, with the difference that the lattice systems of FIGURE 4 extend in the vehicle transverse direction instead of the vehicle longitudinal direction as in FIGURE 2.

FIGURE 5 shows a roof in which connecting means 6 or 6' interconnecting the outer cover 4 with the inner cover 5 are rigidly connected with each other at the junction points 18 thereof. The junction points 18 in FIGURE 5 are additionally connected with each other by further connecting means 19 which extend essentially parallel to the inner and outer covering 4 and 5 of the roof 2.

FIGURE 6 illustrates a roof 2 in which the seal 20 for the window pane 21 is built into the roof 2. The distance of the lattice system in the vehicle longitudinal or in the vehicle transverse direction from one another does not have to be the same distance. The minimum distance of the lattice systems from one another is determined essentially by the magnitude of the required air pressure within the roof and by the selected form or shape of the roof.

While I have shown and described several embodiments in accordance with the present invention, it is understood that the same is not limited thereto but is susceptible of many changes and modifications within the scope and spirit of the present invention, and I, therefore, do not wish to be limited to the details shown and described herein, but intend to cover all such changes and modifications as are encompassed by the scope of the appended claims.

I claim:
1. A foldable roof for motor vehicles, comprising means including inner cover means and outer cover means forming an air-tight casing provided with a hollow space adapted to be filled with compressed air, said outer cover means having a substantially smooth contour upon inflation of said roof, and rod-like connecting means arranged within said hollow space and operatively connecting said inner and outer cover means with each other, said connecting means being subjected to tensional loads upon inflation of said roof, said connecting means including first means extending substantially perpendicularly between said inner and outer cover means and interconnecting oppositely disposed points on said inner and outer cover means and diagonally extending second means interconnecting respective points on one of said cover means with points spaced from said oppositely disposed points on the other cover means, adjacent ones of said diagonally extending second means being secured to each other at points substantially midway between said inner cover means and said outer cover means, and additional rod-like connecting means interconnecting said last-mentioned points and extending substantially parallel to said inner and outer cover means upon inflation of said roof, each of said first, second and additional means extending substantially in the longitudinal direction of the vehicle.

2. A foldable roof for motor vehicles, comprising means including inner cover means and outer cover means forming an air-tight casing enclosing a hollow space adapted to be filled with compressed air, and lattice-type connecting means arranged within said space and operatively connecting said inner and outer cover means with each other, said lattice-type connecting means including a plurality of securing points upon facing surfaces of said inner and outer cover means, the securing points on said inner cover means being disposed essentially below corresponding securing points on said outer cover means over the major portion of the width of said roof, first rod-like means interconnecting said corresponding securing points on said inner and outer cover means, second rod-like means extending from a securing point on one of said cover means diagonally to the securing points on the other of said cover means surrounding the respective corresponding securing point on the other of said cover means, the diagonally extending second means from the securing points on one of said cover means being joined to the diagonally extending second means from the corresponding points on the other of said cover means substantially midway between said cover means.

References Cited in the file of this patent
UNITED STATES PATENTS

| | | |
|---|---|---|
| 1,976,793 | Mangold | Oct. 16, 1934 |
| 2,448,054 | Seckel | Aug. 31, 1948 |
| 2,657,716 | Ford | Nov. 3, 1953 |
| 2,747,929 | Masano | May 29, 1956 |
| 2,753,573 | Barker | July 10, 1956 |
| 2,833,593 | Olivier et al. | May 6, 1958 |
| 2,838,341 | Watson | June 10, 1958 |